United States Patent
Matecki et al.

(10) Patent No.: US 12,391,200 B2
(45) Date of Patent: *Aug. 19, 2025

(54) MULTI-TUBULAR BEAM WITH FORGED WELD SEAM

(71) Applicant: Shape Corp., Grand Haven, MI (US)

(72) Inventors: Joseph R. Matecki, Allendale, MI (US); Jeffrey McHenry, Norton Shores, MI (US); Scott Navarre, Spring Lake, MI (US)

(73) Assignee: Shape Corp., Grand Haven, MI (US)

( * ) Notice: Subject to any disclaimer, the term of this patent is extended or adjusted under 35 U.S.C. 154(b) by 497 days.

This patent is subject to a terminal disclaimer.

(21) Appl. No.: 17/461,049

(22) Filed: Aug. 30, 2021

(65) Prior Publication Data

US 2023/0062947 A1    Mar. 2, 2023

(51) Int. Cl.
| | | |
|---|---|---|
| *B60R 19/18* | (2006.01) | |
| *B23K 9/025* | (2006.01) | |
| *B23K 9/23* | (2006.01) | |
| *B60R 19/03* | (2006.01) | |
| *B23K 101/00* | (2006.01) | |

(Continued)

(52) U.S. Cl.
CPC .............. *B60R 19/03* (2013.01); *B23K 9/025* (2013.01); *B23K 9/23* (2013.01); *B60R 19/18* (2013.01); *B23K 2101/006* (2018.08); *B23K 2101/34* (2018.08); *B23K 2103/04* (2018.08); *B60R 2019/1813* (2013.01)

(58) Field of Classification Search
CPC . B60R 19/03; B60R 19/18; B60R 2019/1813; B23K 9/025; B23K 9/23; B23K 2101/006; B23K 2101/34; B23K 2103/04
See application file for complete search history.

(56) References Cited

U.S. PATENT DOCUMENTS

| | | |
|---|---|---|
| 2,171,540 A | 9/1939 | Calkins et al. |
| 6,217,089 B1 * | 4/2001 | Goto .................. B60R 19/18 |
| | | 293/122 |
| 6,575,198 B2 | 6/2003 | Yoshitoshi et al. |

(Continued)

OTHER PUBLICATIONS

Mira-Aguiar, T., Leitão, C. & Rodrigues, D.M. Solid-state resistance seam welding of galvanized steel. Int J Adv Manuf Technol 86, 1385-1391 (2016). https://doi.org/10.1007/s00170-015-8294-5 (Year: 2016).*

(Continued)

*Primary Examiner* — Gregory A Blankenship
(74) *Attorney, Agent, or Firm* — Bodman PLC

(57) ABSTRACT

A reinforcement beam for an automotive component is continuously formed with a metal sheet that is roll formed to have at least one tubular portion that extends along a length of the reinforcement beam. A solid state forge weld is formed between an edge of the metal sheet and an intermediate portion of the metal sheet to close a seam that extends along the tubular portion of the reinforcement beam. Prior to forming the solid state forge weld, select portions of the metal sheet are heated to a desirable welding temperature with a high frequency current delivered by electrical contacts to opposing sides of the weld seam. The desired welding temperature may burn off a galvanized coating on the metal sheet at the select portions prior to forming the solid state forge weld that is generally void of zinc inclusions.

17 Claims, 9 Drawing Sheets

(51) Int. Cl.
  *B23K 101/34* (2006.01)
  *B23K 103/04* (2006.01)

(56) References Cited

U.S. PATENT DOCUMENTS

| | | |
|---|---|---|
| 9,381,880 B2 | 7/2016 | Matecki et al. |
| 9,669,786 B2 | 6/2017 | Johnson et al. |
| 10,155,493 B2 | 12/2018 | Matecki et al. |
| 11,524,645 B2 * | 12/2022 | Pendergrass ........... B62D 25/06 |
| 2005/0162631 A1 * | 7/2005 | Graber ................... B60R 19/18 |
| | | 355/67 |
| 2012/0074720 A1 | 3/2012 | Johnson et al. |
| 2012/0126553 A1 | 5/2012 | Mildner et al. |
| 2014/0361558 A1 | 12/2014 | Malkowski et al. |
| 2014/0377484 A1 | 12/2014 | Oxley et al. |
| 2015/0307045 A1 | 10/2015 | Matecki et al. |
| 2017/0259767 A1 | 9/2017 | Johnson et al. |
| 2020/0164820 A1 | 5/2020 | Baas et al. |

OTHER PUBLICATIONS

International Search Report for PCT/2022/075652, mailed Dec. 15, 2022; 6 pp.

* cited by examiner

MULTI-TUBULAR BEAM WITH FORGED WELD SEAM

TECHNICAL FIELD

The present disclosure relates to vehicle structural and reinforcement beams and associated methods of roll form manufacturing and beam welding.

BACKGROUND

Vehicles are subjected to various tests that are mandated by government regulations and insurance certifications, such as tests for impact energy management and absorption. The results of these impact tests may be dependent on various vehicle components and structural designs, including bumper assemblies and the associated bumper reinforcement beams. To protect the performance and structural integrity of vehicle components over time, it is known to galvanize or apply protective zinc coatings to steel components of a vehicle, which can prevent rust or iron oxide from forming on the steel components. However, galvanized sheet metal can be more difficult to form and weld, especially with laser welding in roll forming operations. Also, some roll formed beam designs, regardless of the presence of galvanized coating, can be difficult to laser weld due to material geometries and seam conditions.

SUMMARY

The present disclosure provides a multi-tubular reinforcement beam and a method of continuously forming the beam, which may be used as a structural component or as an energy absorber for a vehicle, such as a bumper beam. Initially, a roll of metal sheet stock may be uncoiled in a generally horizontal plane to be processed, such as by being uncoiled at a generally constant rate toward and into a roll former. The metal sheet may be a high strength steel, such as a martensitic steel. The roll former is configured to form the sheet into a beam with at least one longitudinally extending tubular portion that is closed with a weld seam formed between an edge of the sheet and an intermediate portion of the sheet. The weld seam may be formed with a high frequency, electric resistance welding process, such as by contacting the formed sheet with a pair of electrical contacts that slide along on opposing sides of a weld seam immediately before entering a closing pressure roll that closes the weld seam. The resistance of the high frequency current delivered by the electrical contacts heats the outside surface of the two opposing portions of the weld seam to a suitable welding temperature, such that the two heated opposing portions are then pressed together by the closing pressure roller to from a solid state forge weld. In some examples, the metal sheet may include a galvanized coating, such that when the outside surface of the sheet is heated, the galvanized coating at least partially burns off and forms zinc oxide gas, so as to generally not interfere with the forge weld formed by the closing pressure roll.

According to one aspect of the present disclosure, a reinforcement beam for an automotive component includes a metal sheet roll that is formed to have a pair of tubular portions that share a common center wall and that extend along a length of the reinforcement beam. A solid state forge weld is formed in-line with the roll formed metal sheet between an edge of the metal sheet and an intermediate portion of the metal sheet to close a seam at an end of the common center wall that encloses one of the pair of tubular portions. The seam formed by the solid state forge weld extends continuously along the length of the reinforcement beam. Prior to forming the solid state forge weld, outside surfaces of the edge of the metal sheet and the intermediate portion of the metal sheet are heated with electrical resistance to a desirable forge welding temperature.

Implementations of the disclosure may include one or more of the following optional features. In some implementations, the solid state forge weld has a narrow heat affect zone between 1 mm and 2 mm in width. In some examples, a second edge of the metal sheet is welded at a second end of the common center wall of the reinforcement beam with a second forge weld to enclose the other of the pair of tubular portions that extends along the length of the reinforcement beam. The reinforcement beam may, for example, include a front impact face defined by front walls of the pair of tubular portions. The front wall of at least one of the pair of tubular portions may include a stiffening rib that protrudes into an interior volume of the respective tubular portion to stiffen the front impact face.

In some implementations, the solid state forge weld is formed with heat generated by electrical resistance of high frequency current that is delivered by electrical resistance welding contacts and a closing pressure roll that presses heated surfaces of the metal sheet together. The metal sheet, in some examples, includes a high-strength steel, such that a desired welding temperature is below the melting temperature of the high-strength steel of the metal sheet. In some implementations, the metal sheet includes a galvanized coating, such that the desired welding temperature burns off the galvanized coating on the metal sheet at the outside surfaces prior to forming the solid state forge weld.

According to another aspect of the present disclosure, a reinforcement beam for an automotive component includes a galvanized metal sheet that is roll formed to have a tubular portion that extends along a length of the reinforcement beam. A solid state forge weld is formed between an edge of the galvanized metal sheet and an intermediate portion of the galvanized metal sheet to close a seam that extends along the tubular portion of the reinforcement beam. Prior to forming the solid state forge weld, outside surfaces of the edge of the galvanized metal sheet and the intermediate portion of the galvanized metal sheet are heated to a desirable welding temperature with high-frequency current delivered by electrical contacts. The desired welding temperature burns off a galvanized coating on the galvanized metal sheet at the outside surfaces prior to forming the solid state forge weld that is generally void of zinc inclusions.

According to yet another aspect of the present disclosure, a method of continuously forming a galvanized reinforcement beam may be done by uncoiling a roll of galvanized metal sheet in a generally horizontal plane. The metal stock is roll formed through a set of a plurality of roll stations to form a tubular shape with an edge section of the metal sheet near contact with an intermediate section of the metal sheet. The outside surfaces of the edge section of the metal sheet and the intermediate section of the metal sheet are heated to a desirable welding temperature with high frequency current delivered by a pair of electrical contacts in contact with the sheet near the outside surfaces, which causes the galvanized coating on the metal sheet to at least partially burn off at the heated outside surfaces. A solid state forge weld is then formed at the heated outside surfaces of the edge section and the intermediate section of the metal sheet by pressing the outside surfaces together with a closing pressure roll. The solid state forge weld is formed continuously to close a seam of the tubular shape of the reinforcement beam.

Optionally, after the first tubular portion is closed with the first forge weld, the galvanized metal sheet may be rolled formed with a second set of the roll formers to move the opposing edge of the galvanized metal sheet into close proximity to the wall of the tubular portion so that these close outside surfaces may be heated with high frequency current delivered by a second pair of electrical contacts for forming a second forge weld that closes a seam along a second tubular portion of the reinforcement beam. In some examples, the metal sheet is uncoiled, roll formed, and welded in a longitudinal direction at a generally constant speed.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals indicate like parts throughout the drawings.

DETAILED DESCRIPTION

Figure 1:
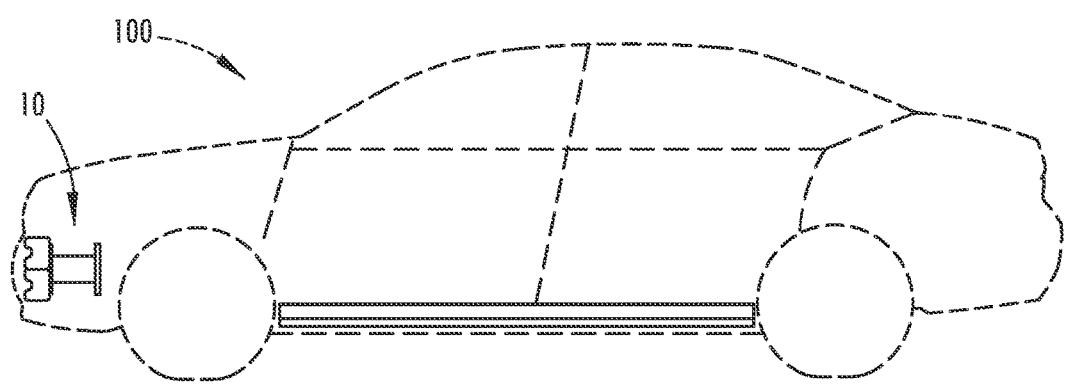
FIG. 1 is a schematic side elevation view of a vehicle having a bumper assembly and a rocker component.

Referring now to the drawings and the illustrative embodiments depicted therein, a vehicle 100, such as shown in FIG. 1, has various structural beam components, including a bumper assembly with a bumper reinforcement beam 10a and a sill assembly with a rocker reinforcement insert 10b. The bumper assembly includes crush cans 102 that are attached to end portions of the reinforcement beam 10a. The crush cans 102 are adapted to mount directly or indirectly to the vehicle frame or end sections or tips of a vehicle frame. When attached to the vehicle frame, the crush cans 102 support and position the reinforcement beam 10a to span laterally across the vehicle 100, such as at the front end shown in FIG. 1. Also, the rear end of the vehicle may include a bumper reinforcement beam to similarly mitigate impact damage and intrusion to the vehicle. In other examples, the bumper beam may be used with different types of bumper assemblies or supportive structure at the front end or rear end of a vehicle.

As also shown for example in FIG. 1, the vehicle 100 may have a sill assembly that supports the lower components of the frame, such as the A-pillars, B-pillars, cross members or the like. The sill assembly may include a sill inner and a sill outer that enclose a hollow interior, where the reinforcement insert 10b extends longitudinally in the hollow interior between the sill inner and the sill outer. The reinforcement insert 10b is provided to stiffen and reinforce the sill assembly, such as to reduce the intrusion distance caused by vehicle side impacts. The bumper reinforcement beam 10a, the reinforcement insert 10b, and other reinforcement beams of the present disclosure may be formed from a galvanized metal sheet. The vehicle frame and body structure may have various designs and configurations for different styles and types of vehicles.

Figure 2:
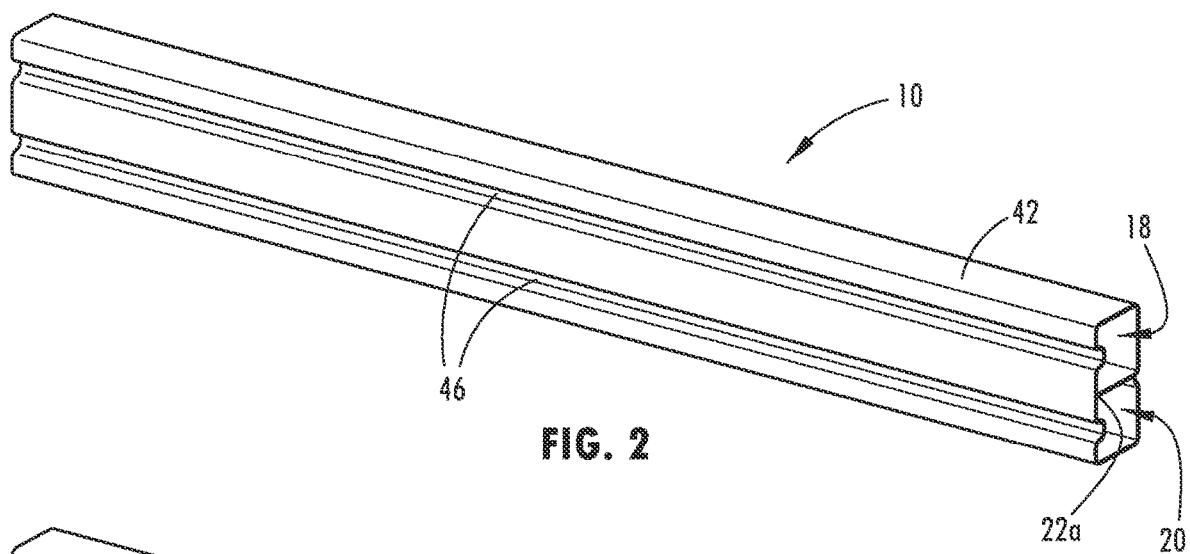
FIG. 2 is a front perspective view of a reinforcement beam.
Figure 3:
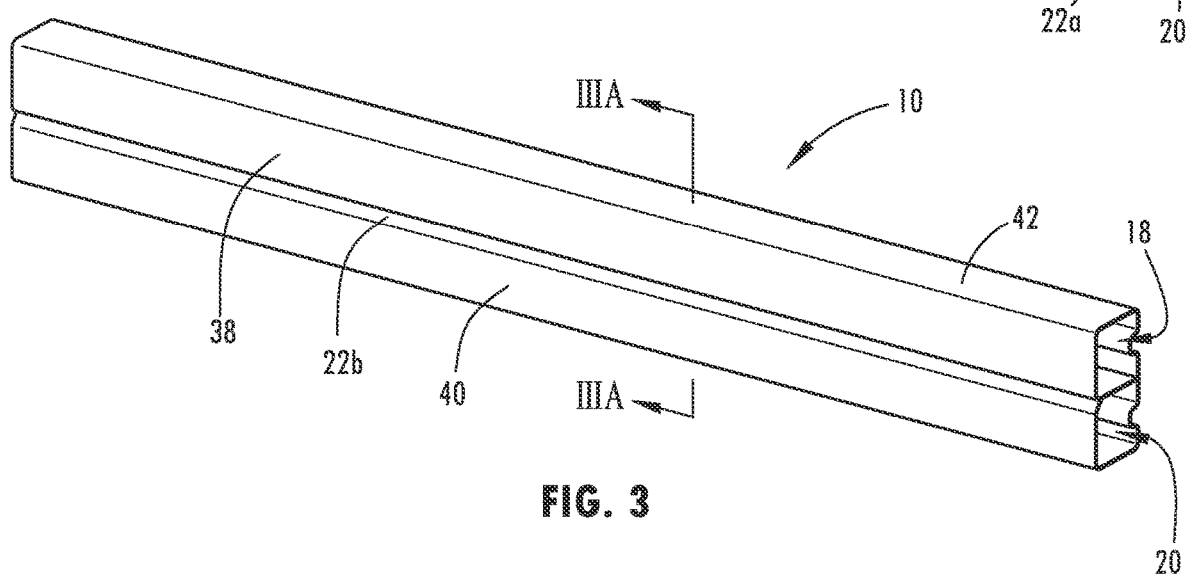
FIG. 3 is a rear perspective view of the reinforcement beam shown in FIG. 2.
Figure 3A:
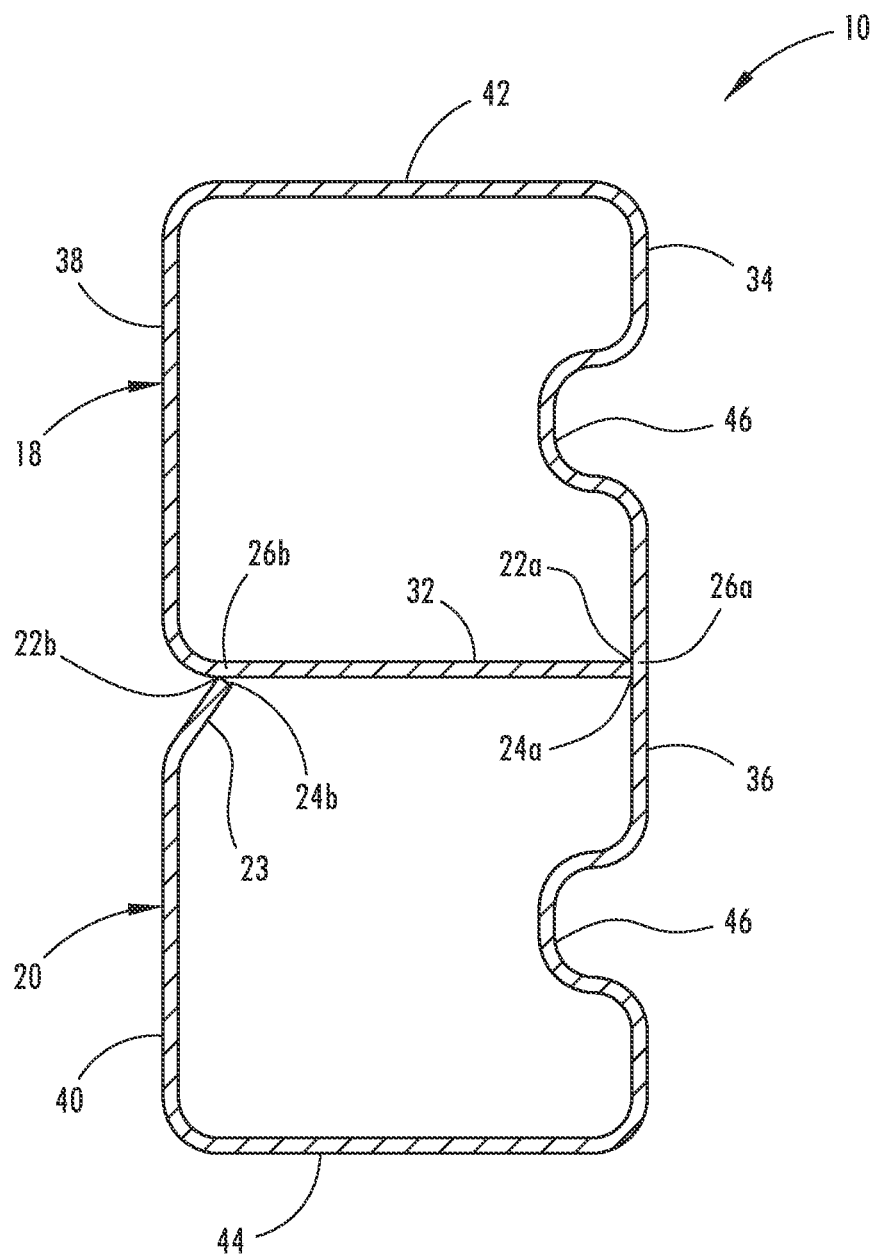
FIG. 3A is a cross-sectional view of the reinforcement beam taken at line IIIA-IIIA shown in FIG. 3.

As shown in FIGS. 2-3A, a reinforcement beam 10 is provided that may be continuously formed with a metal sheet that passes through a roll former and an in-line welder. The welder uses electric resistance welding to form a forge weld along at least one weld seem that encloses a tubular shape of the beam. The reinforcement beam 10 may be used structurally or as an energy absorber for a vehicle, such as a bumper reinforcement beam 10a (FIG. 1), a rocker reinforcement insert 10b (FIG. 1), or another structure vehicle component. The beam described herein may be adapted for various structural or reinforcement applications, whether linear or longitudinally curved in order to correspond with a design of a particular vehicle, such as a bumper beam, a roof bow, a header, a pillar, a rocker rail, a seat member, and a door beam of a vehicle frame, among other conceivable vehicle and non-vehicle related components.

Figure 4:
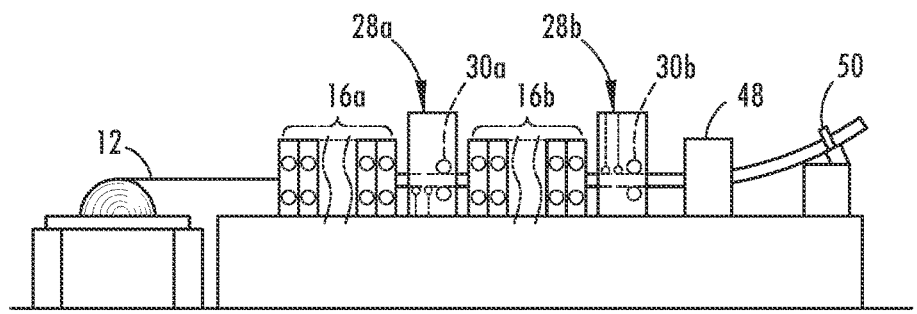
FIG. 4 is a schematic side elevation view of an apparatus configured to manufacture the reinforcement beam shown in FIG. 2.

Generally, to form the reinforcement beam 10, a roll of sheet metal 12 is initially uncoiled in a generally horizontal plane to be processed, such as by being uncoiled at a generally constant rate toward and into a roll former 14, such as shown schematically in FIG. 4. The roll former 14 is configured to iteratively form the sheet 12 into the reinforcement beam 10 with a series of roll tools or forming rolls 16a, 16b supported on roll stands. The roll tools or forming rolls 16a, 16b may consecutively form the sheet 12 to have at least one longitudinally extending tubular portion, such as two tubular portions 18, 20 as shown in FIG. 3. The tubular portions 18, 20 are each closed with a weld seam 22a, 22b that is formed between an edge 24a, 24b of the sheet 12 and an intermediate portion 26a, 26b of the sheet 12, such as to form a tee joint or generally T-shaped joint at the weld seam 22a, 22b.

The weld seams 22a, 22b may be formed with a high frequency, electric resistance welding process. For example, as shown in FIG. 4, high frequency contact welding may be performed by contacting the formed sheet 12 with a pair of electrical contacts 28a, 28b on opposing sides of a weld seam near or immediately before entering a closing pressure roll 30a, 30b that presses the heated edge and heated intermediate portion of the sheet together to simultaneously form a weld and close the weld seam 22a, 22b. As such, the desired welding temperature is below the melting temperature of the high-strength steel of the galvanized metal sheet. The electrical contacts maintain contact with and slide along the sheet 12 as it continuously moves through the weld station. The resistance of the current delivered by the pair of electrical contacts 28a, 28b generates heat at the outside surfaces of the edge of the sheet 12 and the intermediate portion of the sheet 12 where these portions of the sheet 12 interface and come together. As the outer surfaces of the sheet 12 are heated by the current delivered by the electrical contacts 28a, 28b, the galvanized coating at least partially burns off or vaporizes at the edge and intermediate portion of the sheet 12 and forms zinc oxide gas. By vaporizing the galvanized coating before the outside surfaces interface together and form the weld at the weld seam 22a, 22b, these zinc oxide gases generally do not interfere with the quality and consistency of the solid state forge weld formed by the closing pressure roll 30a, 30b. The pressure applied by the closing pressure roll 30a, 30b may reduce or eliminate the trapping of zinc oxide gases in or near the resulting weld, such as to form a solid state forge weld that is generally void of zinc inclusions or other defects related to the zinc oxide gases generated in the welding process.

As shown in FIGS. 2-3A, the reinforcement beam 10 has two adjacent tubular portions 18, 20 that share a common center wall 32 that extends along a length of the beam 10. The tubular portions 18, 20 of the beam 10 each also have front walls 34, 36 and rear walls 38, 40 that are planar shaped and generally aligned with each other. The upper tubular portion 18 is provided with an upper wall 42 of the beam 10 and the lower tubular portion 20 is provided with a lower wall 44 of the beam 10. The front walls 34, 36 of the tubular portions 18, 20 are substantially aligned in a common plane with each other so as to form an outward facing or impact surface of the beam 10 when used as a bumper reinforcement beam. Similarly, the rear walls 38, 40 are in general planar alignment with each other and are substantially parallel with the front walls 34, 36. Further, the upper and lower walls 42, 44 are substantially parallel with each other and the center wall 32 and generally perpendicular with the front and rear walls 34, 36, 38, 40. The corners between the walls of the tubular portions 18, 20 of the beam 10 have a curvature generally defined by the material type and thickness of the metal sheet 12, such as a radius of curvature of approximately equal or greater than four times the thickness of the metal sheet 12. It is understood that additional embodiments of the beam may assume various shapes and orientations from that shown in FIGS. 2-3A and may include alternatively dimensional proportions, such as for different applications of the beam.

As further shown in FIGS. 2-3A, the front walls 34, 36 of the tubular portions 18, 20 each include a stiffening rib 46 that protrudes into an interior volume of the respective tubular portion 18, 20 to stiffen the front impact face of the reinforcement beam 10. The illustrated stiffening ribs 46 have a width diameter about 10%-40% of a width of the corresponding wall section (or more preferably about 20%-30% of the width of the corresponding wall section) and has a depth about equal to its width diameter. The bottoms of the illustrated stiffening ribs 46 are semicircular shaped. Nonetheless, it is contemplated that a depth and size of the stiffening ribs can be made shallow, deeper, wider, narrower, flat-bottomed, or otherwise modified to satisfy specific requirements of a beam.

Referring now to FIG. 4, the sheet stock 12 that is uncoiled from the roll may have a thickness that is approximately between 1 mm and 1.5 mm and may have a galvanized coating, such as an electroplated galvanized coating to provide a generally uniform thickness that is less than approximately 5 mils (0.127 mm). It is contemplated that in additional examples that the sheet of steel material may have a thickness of about 0.8 mm to 3.0 mm and the sheet may have a tensile strength of about 800 to 2000 MPa (i.e. about 120 to 290 ksi). Furthermore, the present beam can be made of various materials, such as high-strength steel, including AHSS (Advanced High Strength Steels). It is also understood that additional examples of the sheet stock may not be galvanized or be galvanized with different methods, such as hot-dip galvanization.

As shown in FIG. 4, after the steel sheet 12 passes through the first set of roll tools or forming rolls 16a supported on roll stands, the sheet 12 may be formed to have at least one tubular shape that has a generally consistent cross-sectional shape along its length. In forming the tubular shape, the first set of forming rolls 16a may position the edge 24a of the sheet 12 in close proximity to the intermediate portion 26a of the sheet 12, immediately prior to closing the first tubular portion 18 of the beam 10. With a slight gap remaining between the edge 24a and the intermediate portion 26a of the sheet 12, the intermediately formed sheet 12 continuously enters a welding station that places a pair of electrical contacts 28a on opposing sides of the gap, which transmit a high frequency current to the partially formed beam. Specifically, such as shown in FIG. 5A, an electrical contact 28a is placed in contact with the portion of the sheet 12 near the edge 24a of the sheet 12 and another electrical contact 28a is placed in contact with near the intermediate portion 26a of the sheet 12. The close proximity of the electrical contacts 28a to the weld seam 22a provides a high current density that generally provides a correspondingly high weld efficiency, along with a generally small heat effect zone. As shown in FIG. 5A, the electrical contacts 28a may be placed in contact with adjoining, adjacent surfaces of the sheet 12, so that the current may be concentrated along the contacted surface of the sheet.

The electrical current travels from one electrical contact 28a to the other 28a so as to generate heat with the resulting electrical resistance at the outside surfaces of the edge 24a of the sheet 12 and the intermediate portion 26a of the sheet 12, with the heat generally concentrating where these portions of the sheet 12 interface and come together, such as in a V-shape. The pair of electrical contacts 28a causes current flows down along the geometric V-shape created by the edge 24a and the intermediate portion 26a of the sheet 12. As current flows along the edge 24a and intermediate portion 26a, they will heat up to a suitable welding temperature that is below the melting temperature of the sheet material.

As further shown in FIG. 5A, the electrical contacts 28a may include spring-loaded contact plates that are biased toward and against the desired portion of the sheet 12. The tip portion of the spring-loaded contact plates may be engaged directly against the sheet 12, so as to slide along the outer surface of the sheet 12 as the sheet moves through the weld station. However, it is contemplated that electrical contact in additional embodiments may alternatively include contact wheels or discs that roll against the sheet to reduce friction between the electrical contact and the surface of the sheet, which can lead to deterioration of a tip portion of contact plates, and in the case of galvanized sheet metal, prevent the tip portion from scrapping zinc off of the galvanic coating and accumulating on the tip portion or other portion of electrical contact.

Also in the examples of using galvanized sheet metal, when the outside surfaces of the sheet 12 are heated by the electrical contacts 28a to the desired welding temperature, the galvanized coating at least partially burns off or vaporizes at the edge 24a and intermediate portion 26a of the sheet 12 and forms zinc oxide gas. The high frequency current delivered to the opposing portions of the seam may be selected or configured to heat the outside surfaces of the edge 24a of the sheet 12 and the intermediate portion 26a of the sheet 12, such that they reach a desired weld temperature for the particular material and sheet thickness when the interfacing surfaces of the sheet contact. In addition to providing the desired welding temperature at the interfacing weld seam 22a, the high frequency current may also be selected or configured in cooperation with the speed of the sheet for the edge 24a and the intermediate portion 26a of the sheet 12 to reach a sufficient temperature for a duration long enough to burn off or vaporize the galvanized coating at the interfacing surfaces. The high frequency current may be between 80 KHz and 800 KHz or between 150 KHz and 800 KHz or between 150 KHz and 450 KHz or approximately 350 KHz.

Figure 5:
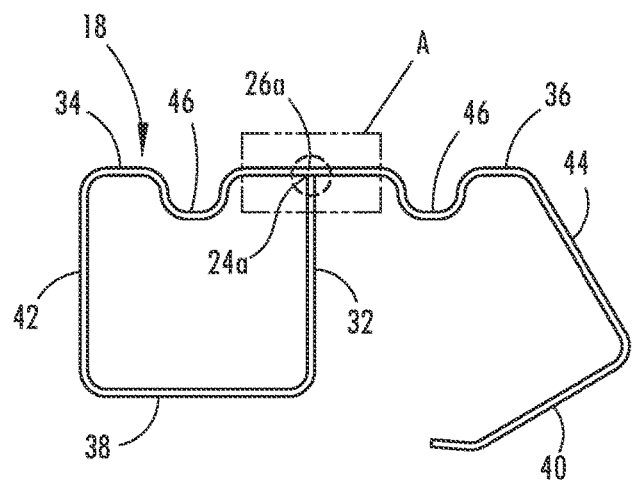
FIG. 5 is a cross-sectional view of the reinforcement beam of FIG. 2 at an intermediate forming step with a forge weld.
Figure 5A:
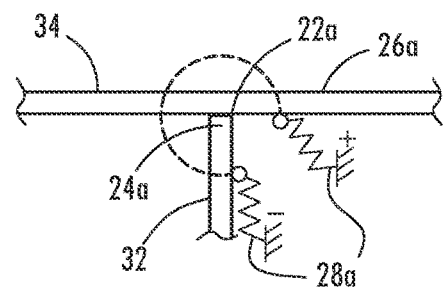
FIG. 5A is an enlarged view of the weld location shown at section A of FIG. 5, schematically showing weld contacts.

Immediately after passing the electrical contacts 28a, the sheet 12 enters a closing pressure roll 30a that presses the edge 24a and intermediate portion 26a of the sheet 12 together to close the weld seam 22a, such as shown with the cross-section illustrated in FIGS. 5 and 5A. The tubular portion 18 is closed with a weld seam 22a that is continuously formed between the edge 24a of the sheet 12 and the intermediate portion 26a of the sheet 12 along a length of the reinforcement beam 10, such as to form a tee joint or generally T-shaped joint at the weld seam 22a. As shown in FIG. 5A, the forge weld 22a may be disposed at a rear surface of a front impact wall of the reinforcement beam 10 and between the center wall 32 and the front wall 34, 36 of the tubular portions 18, 20. Thus, the front impact face of the reinforcement beam 10 may be void of a weld.

The pressure applied by the closing pressure roll 30a may also reduce or eliminate the trapping of zinc oxide gases in or near the resulting weld, such as to form a solid state forge weld that is generally void of zinc inclusions or other defects related to the zinc oxide gases generated in the welding process of galvanized sheet metal. Moreover, the solid state forge weld formed by the high frequency contact welding that uses the closely located electrical contacts 28a may have a narrow heat affect zone, such as approximately between 1 mm and 2 mm.

Figure 6:
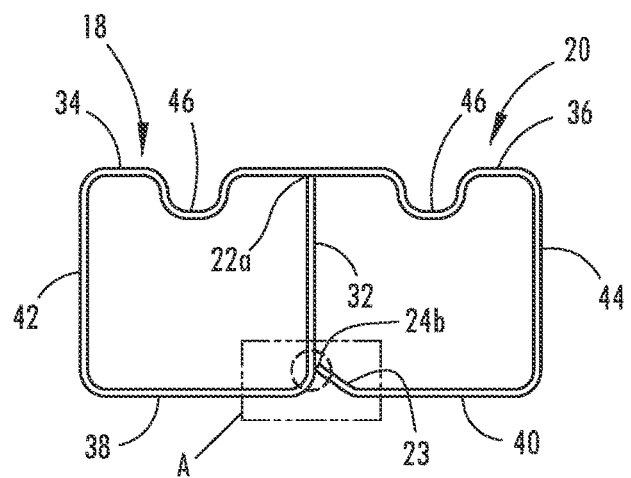
FIG. 6 is a cross-sectional view of the reinforcement beam of FIG. 2 at a forming step with a second forge weld.
Figure 6A:
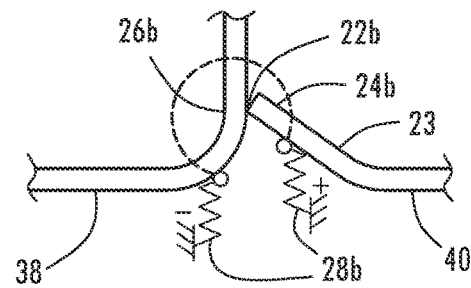
FIG. 6A is an enlarged view of the weld location shown at section A of FIG. 6, schematically showing weld contacts.

After forming the first forge weld along the weld seam 22a, the sheet 12 is further formed with another set of forming rolls 16b to have a cross-sectional shape that locates the other (now the only disconnected) edge 24b of the sheet 12 into close proximity to another intermediate portion 26b of the sheet 12, immediately prior to closing the second tubular portion 20 of the beam 10, such as shown in FIG. 6. With a slight gap remaining between the edge 24b and the intermediate portion 26b of the sheet 12, the formed sheet 12 enters another welding station that places a pair of electrical contacts 28b on opposing sides of the gap and transmit a high frequency current. Specifically, such as shown in FIG. 6A, an electrical contact 28b is placed in contact with the portion of the sheet 12 near the edge 24b of the sheet 12 and another electrical contact 28b is placed in contact with near the intermediate portion 26b of the sheet 12.

The resistance of the current delivered by the pair of electrical contacts 28b generates heat at the outside surfaces of the edge 24b of the sheet 12 and the intermediate portion 26b of the sheet 12 where these portions of the sheet 12 interface and come together in a V-shape. As the outside surfaces of the sheet 12 are heated by the current delivered by the electrical contacts 28b, the galvanized coating at least partially burns off or vaporizes at the edge and intermediate portion of the sheet 12 and forms zinc oxide gas. By vaporizing the galvanized coating before the outside surfaces interface together and form the weld at the weld seam 22b, these zinc oxide gases generally do not interfere with the quality and consistency of the solid state forge weld formed by the closing pressure roll 30b. The pressure applied by the closing pressure roll 30b may reduce or eliminate the trapping of zinc oxide gases in or near the resulting weld, such as to form a solid state forge weld that is generally void of zinc inclusions or other defects related to the zinc oxide gases generated in the process.

Immediately after passing the second pair of electrical contacts 28b, the sheet 12 enters a second closing pressure roll 30b that presses the edge 24b and intermediate portion 26b of the sheet 12 together to close the weld seam 22b, such as shown with the cross-section illustrated in FIG. 6. The second tubular portion 20 is closed with a weld seam 22b that is continuously formed between the edge 24b of the sheet 12 and the intermediate portion 26b of the sheet 12 along a length of the reinforcement beam 10, such as to form a tee joint at the weld seam 22b. Although the second weld seam 22b may be referred to as a tee joint, the edge portion 23 of the sheet 12 that has the edge 24b is angled inward from the planar extent of the rear wall 40 as it extends toward the center wall 32, such that the end portion 23 interfaces with the center wall 32 in an angled orientation that is generally not perpendicular to the interfacing intermediate portion 26b of the center wall 32. However, the angular orientation of the edge portion 23 in other examples may be reduced for the edge 24b to interface with the corner portion between the center wall 32 and the rear wall 38 of the first tubular portion 18. The second edge 24b of the galvanized metal sheet 12 is welded at the wall of the tubular portion 18 of the reinforcement beam 10 to enclose the second tubular portion 20. As shown in FIG. 6, the forge welds seams 22a, 22b are disposed at opposing ends of the common center wall 32.

Referring again to FIG. 4, the apparatus for manufacturing a reinforcement beam may include an in-line sweep station 48 and cutoff 50. Such a sweep station 48 may impart a longitudinal curvature to the beam, such as for providing a longitudinal shape to a bumper beam that corresponds with the front end design of a vehicle. The forge welds formed along the beam that are capable of withstanding longitudinal bending of the beam at the in-line sweep station 48. It is understood that the roller former can utilize a roll mill with horizontal axes supporting forming rolls, or alternatively can utilize a roll mill with vertical axes supporting forming rolls.

Figure 7:
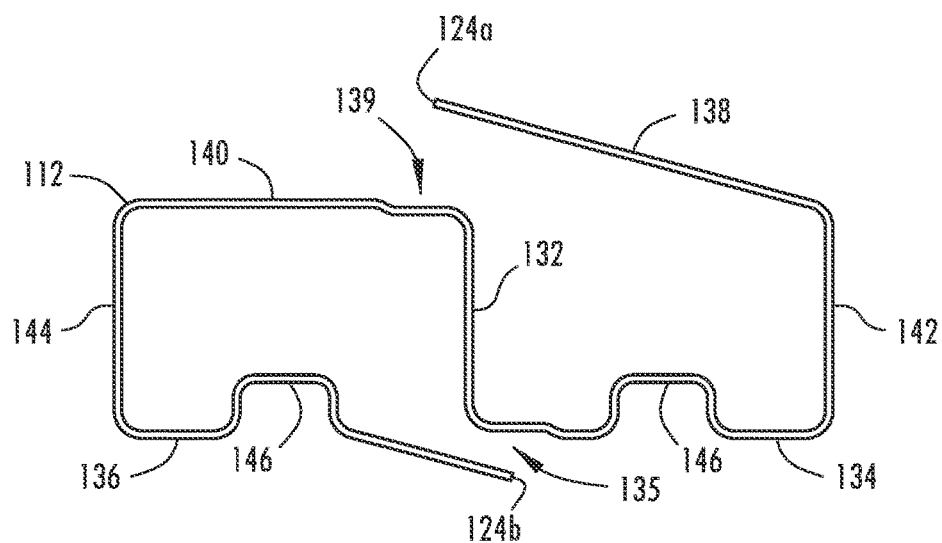
FIG. 7 is a cross-sectional view of an additional example of a reinforcement beam at an intermediate forming step.
Figure 8:
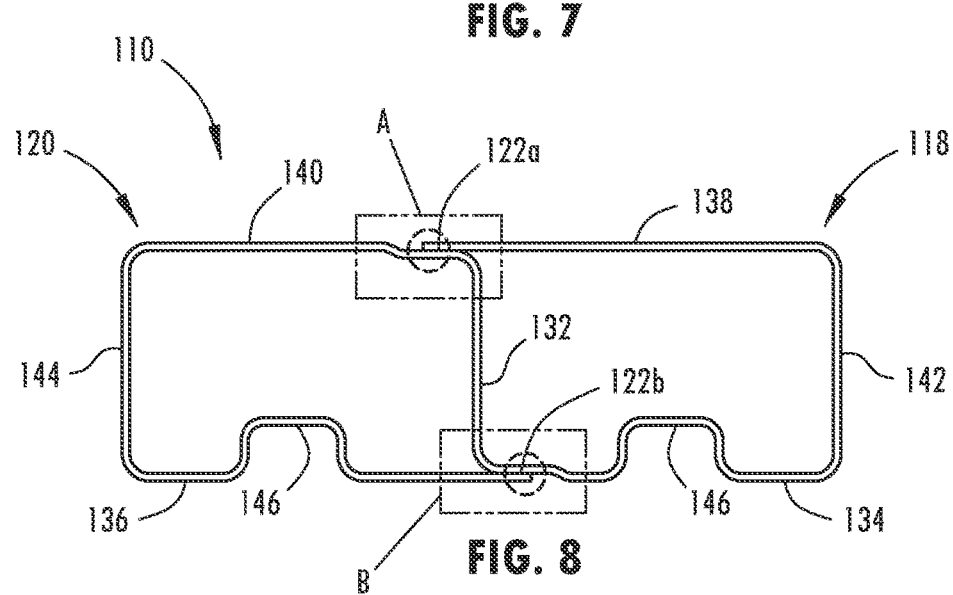
FIG. 8 is a cross-sectional view of the reinforcement beam of FIG. 7 at a later forming step with two forge welds.
Figure 8A:
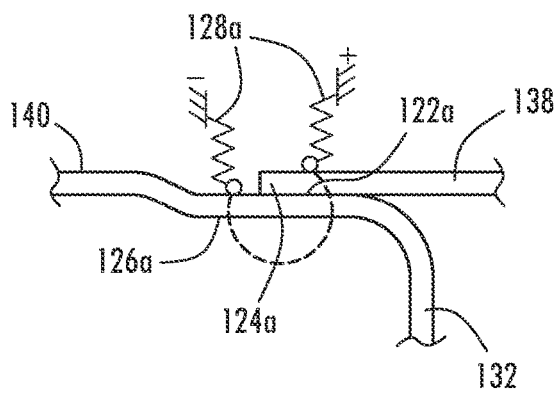
FIG. 8A is an enlarged view of the weld location shown at section A of FIG. 8, schematically showing weld contacts.
Figure 8B:
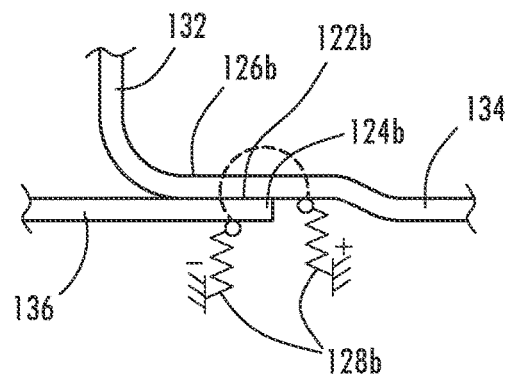
FIG. 8B is an enlarged view of the weld location shown at section B of FIG. 8, schematically showing weld contacts.

As shown in FIGS. 7-8B, an additional example of a reinforcement beam 110 is formed with a steel sheet 112 to provide two adjacent tubular portions 118, 120 that share a common center wall 132. In the example shown in FIG. 7, a first outer section and a second outer section of the metal sheet extend in generally opposing directions from a first end and a second end of the common center wall 132. The first and second outer sections of the metal sheet are formed in the same rotational direction relative to the center wall 132, where the first outer section is formed to attach at or near the second end of the center wall 132 to enclose a first tubular portion 118 and where the second outer section is formed to attach at or near the first end of the center wall 132 to enclose a second tubular portion 120. The first and second outer sections may be formed simultaneously to form the ends of the outer sections toward the ends of the center wall 132. The first and second outer sections each include a recessed area at integral connection to the center wall, so as to provide an area for attaching the ends of the sheet 112.

As shown in FIG. 8, the first outer section is shaped to define a first wall 138, a second wall 142, and a third wall 134 that together with the common center wall 132 form the first tubular portion 118. The second outer section is shaped to define a fifth wall 140, a sixth wall 144, and a seventh wall 136 that together with the common center wall 132 form the second tubular portion 120. In the installed orientation as a bumper reinforcement beam, such as shown in FIG. 1, the first and fifth walls 138, 140 define a rear wall of the reinforcement beam 110, the second wall 142 defines the upper wall, the sixth wall 144 defines the lower wall, and the third and seventh walls 134, 136 define a front wall of the reinforcement beam 110. The recessed area 139 on the fifth wall 140 allows the first and fifth walls 138, 140 to be disposed in generally planar alignment with each other to define the rear wall. Similarly, the recessed area on third wall 134 allows portions of the third and seventh walls 134, 136 at the front impact face of the beam to be disposed in generally planar alignment with each other over the front wall. As further shown in FIG. 8, the upper and lower walls 142, 144 are substantially parallel with each other and the center wall 132 and generally perpendicular with the front and rear walls 134, 136, 138, 140.

With further reference to FIGS. 7-8B, as the sheet is formed by the roll former toward the multi-tubular shape, the forming rolls position the edges 124a, 124b of the sheet 112 in close proximity to the recessed areas 135, 139 at intermediate portions 126a, 126b of the sheet 112, immediately prior to closing the tubular portions 118, 120 of the beam 110. With a slight gap remaining between the edges 124a, 124b and the intermediate portions 126a, 126b of the sheet 112, the formed sheet 112 continuously enters a welding station that places a pair of electrical contacts 128a, 128b on opposing sides of the gap, which transmit a high frequency current to the partially formed beam. Specifically, such as shown in FIGS. 8A and 8B, electrical contacts 128a, 128b are placed in contact with the portions of the sheet 12 near the edges 124a, 124b of the sheet 112 and other electrical contacts 128a, 128b are placed in contact with the intermediate portions 126a, 126b of the sheet 112. The close proximity of the electrical contacts 128a, 128b to the weld seam 122a, 122b provides a high current density that generally provides a correspondingly high weld efficiency, along with a generally small heat effect zone. As shown in FIGS. 8A and 8B, the electrical contacts 128a, 128b may be located for the current to be concentrated along the surfaces of the sheet 112 that are subsequently adjoined. The electrical current travels from one electrical contact to the other in the illustrated pairs so as to generate heat with the resulting electrical resistance at the outside surfaces of the edges 124a, 124b of the sheet 112 and the intermediate portions 126a, 126b of the sheet 112, with the heat generally concentrating where these portions of the sheet 112 subsequently interface.

As further shown in FIGS. 8A and 8B, the electrical contacts 128a, 128b may include spring-loaded contact plates that are biased toward and against the desired portion of the sheet 112. The tip portion of the spring-loaded contact plates may be engaged directly against the sheet 112, so as to slide along the outer surface of the sheet 112 as the sheet moves through the weld station. Also, with the use of galvanized sheet metal, when the outside surfaces of the sheet 112 are heated by the electrical contacts 128a, 128b to the desired welding temperature, the galvanized coating at least partially burns off or vaporizes at the edge 124a and intermediate portion 126a of the sheet 112 and forms zinc oxide gas, which is outgassed due to the gap between the subsequently interfacing surfaces. The high frequency current delivered to the opposing portions of the seam may be selected or configured to heat the outside surfaces of the edge 124a, 124b of the sheet 112 and the intermediate portion 126a, 126b of the sheet 112, such that they reach a desired weld temperature for the particular material and sheet thickness when the interfacing surfaces of the sheet contact. In addition to providing the desired welding temperature at the interfacing weld seams 122a, 122b, the high frequency current may also be selected or configured in cooperation with the speed of the sheet to reach a sufficient temperature at the edges 124a, 124b and the intermediate portions 126a, 126b for a duration long enough to burn off or vaporize the galvanized coating prior to the interfacing surfaces coming into contact. For example, the high frequency current may be between 80 KHz and 800 KHz or between 150 KHz and 800 KHz or between 150 KHz and 450 KHz or approximately 350 KHz.

As shown in the cross-section illustrated in FIG. 8, immediately after passing the electrical contacts 128a, 128b, the sheet 112 enters a closing pressure roll or rolls that simultaneously presses the edges 124a, 124b and intermediate portion 126a, 126b of the sheet 112 together to close the weld seams 122a, 122b. As a result, the tubular portions 118, 120 are simultaneously closed at the weld seams 122a, 122b that are continuously formed between the edges 124a, 124b of the sheet 112 and the intermediate portion 126a, 126b of the sheet 112 along a length of the reinforcement beam 110, such as to forge lap joints at the weld seams 122a, 122b disposed at opposing ends of the common center wall 132. The pressure applied by the closing pressure roll or rolls may also reduce or eliminate the trapping of zinc oxide gases in or near the resulting weld, such as to form a solid state forge weld that is generally void of zinc inclusions or other defects related to the zinc oxide gases generated in the welding process of galvanized sheet metal. Moreover, the solid state forge welds formed by the high frequency contact welding may have a narrow heat affect zone, such as approximately between 1 mm and 2 mm.

Figure 9:
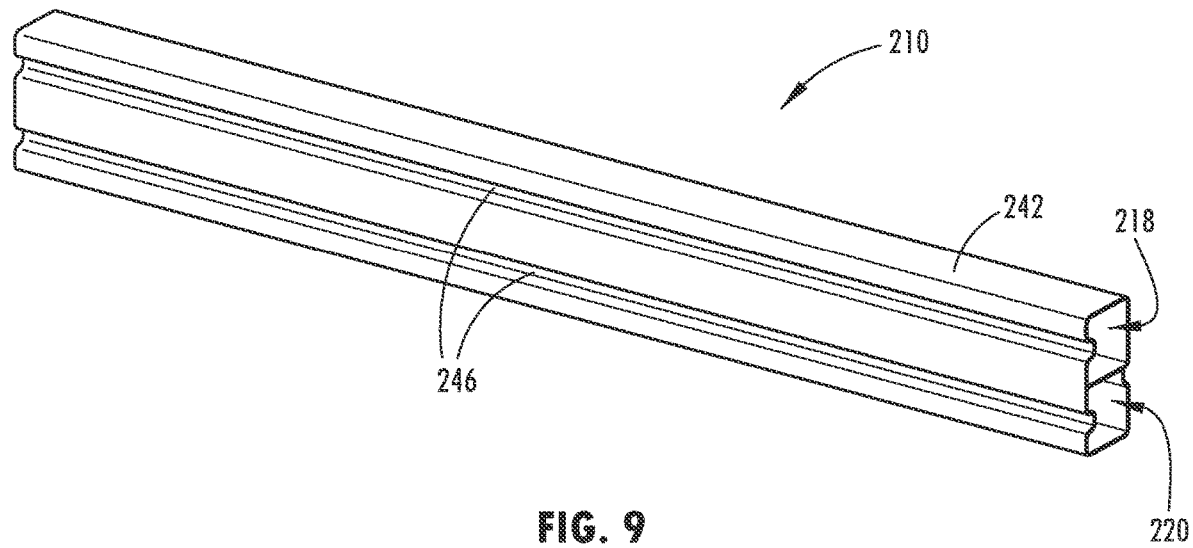
FIG. 9 is a front perspective view of an additional reinforcement beam.
Figure 10:
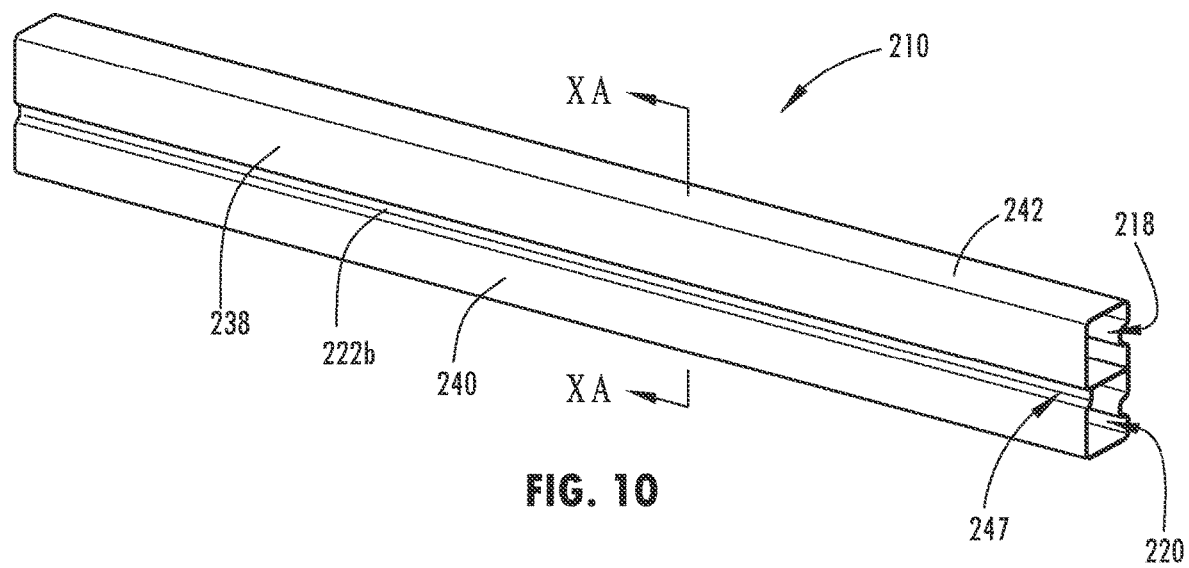
FIG. 10 is a rear perspective view of the reinforcement beam shown in FIG. 9.
Figure 10A:
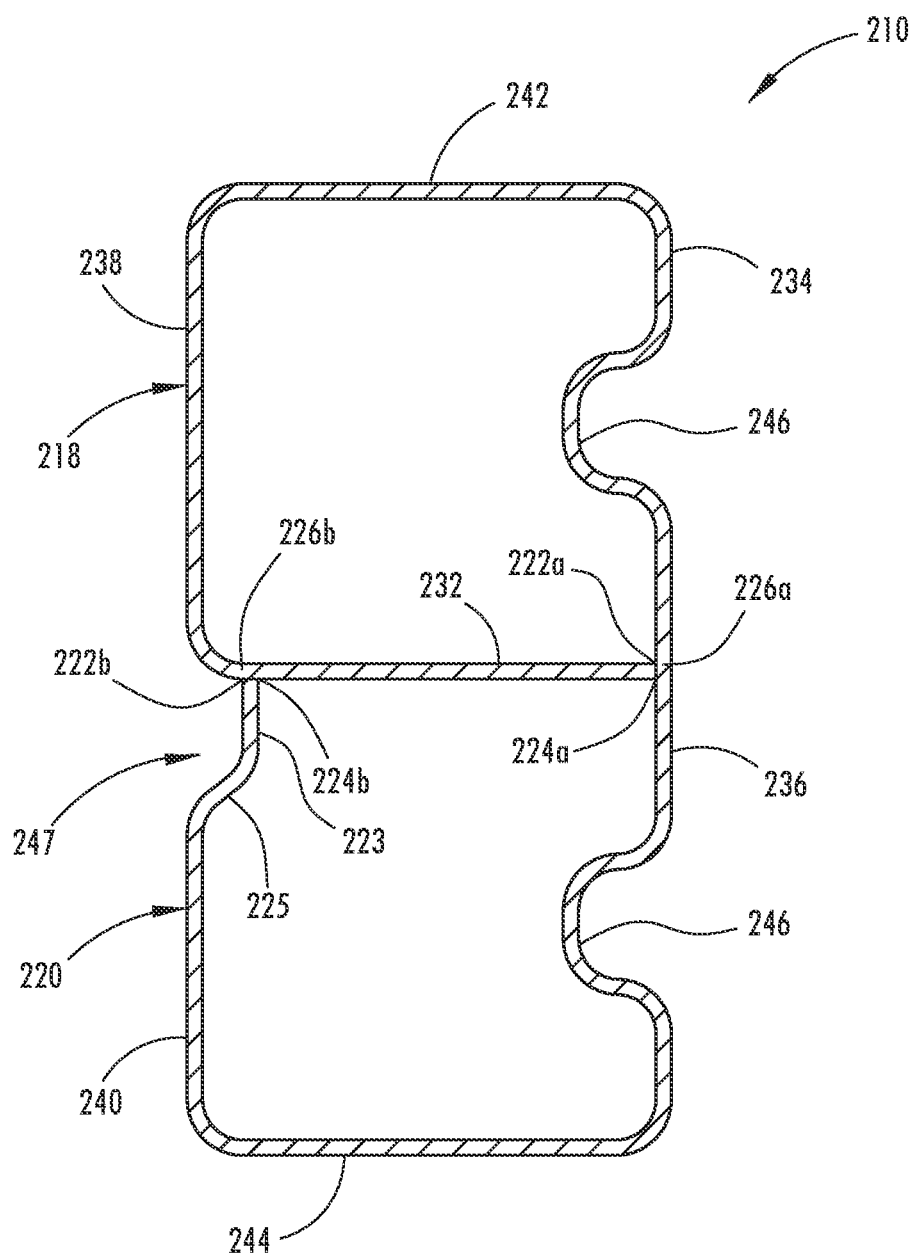
FIG. 10A is a cross-sectional view of the reinforcement beam taken at line XA-XA shown in FIG. 10.
Figure 11A:
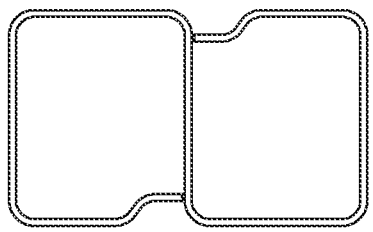
FIGS. 11A-23B are cross-sectional views of additional reinforcement beams.
Figure 11B:
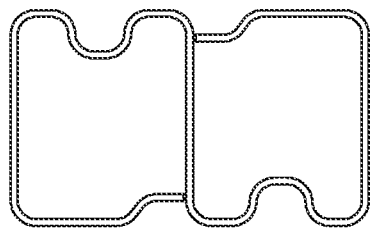
Figure 12A:
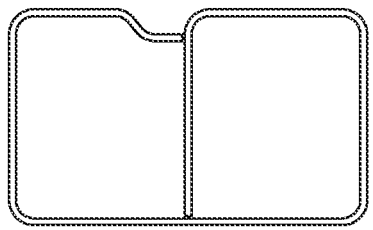
Figure 12B:
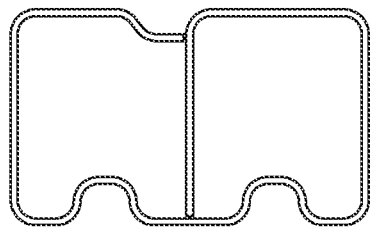
Figure 13A:
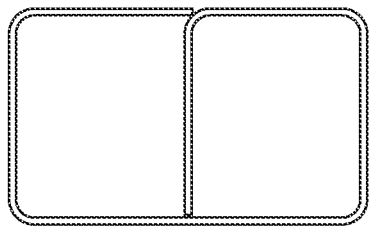
Figure 13B:
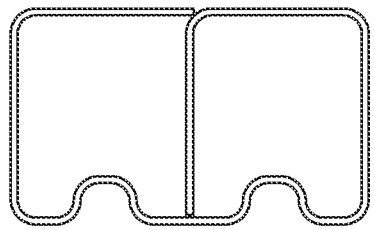
Figure 14A:
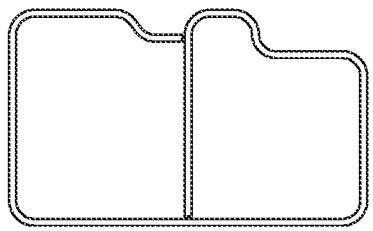
Figure 14B:
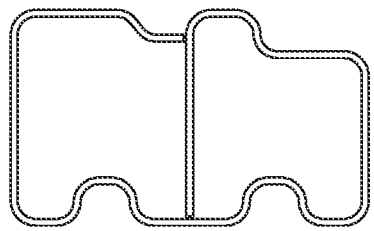
Figure 15A:
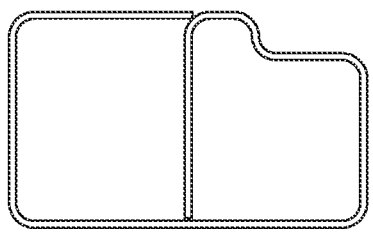
Figure 15B:
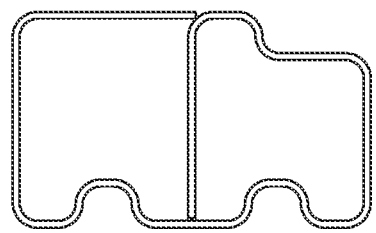
Figure 16A:
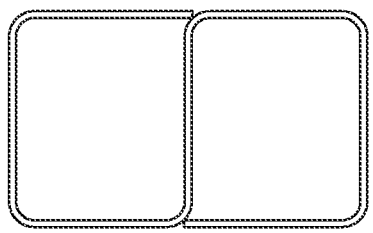
Figure 16B:
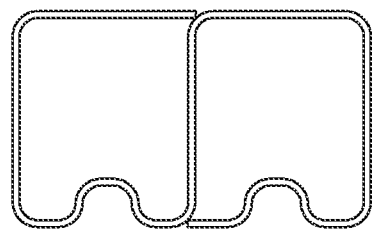
Figure 17A:
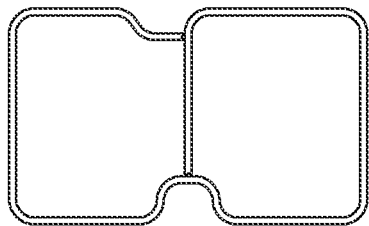
Figure 17B:
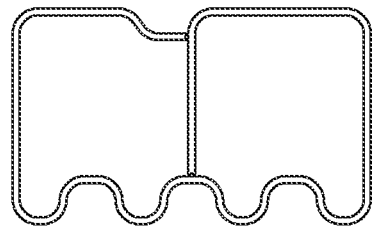
Figure 18A:
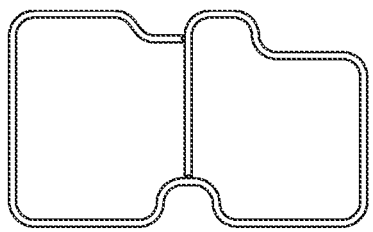
Figure 18B:
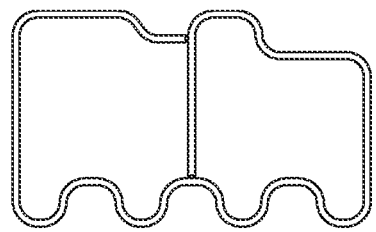
Figure 19A:
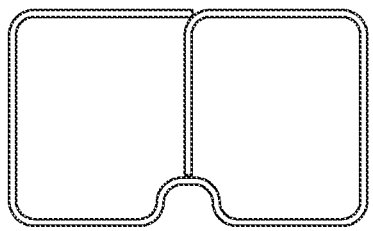
Figure 19B:
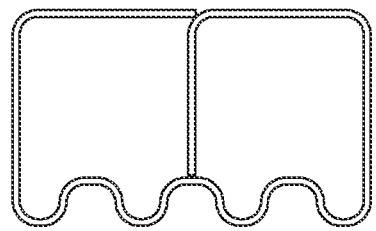
Figure 20A:
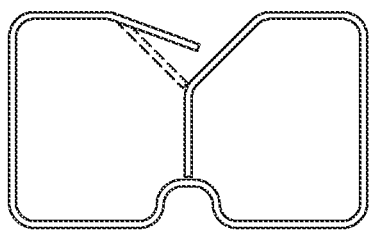
Figure 20B:
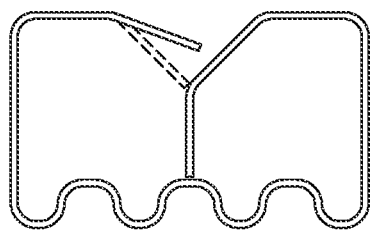
Figure 21A:
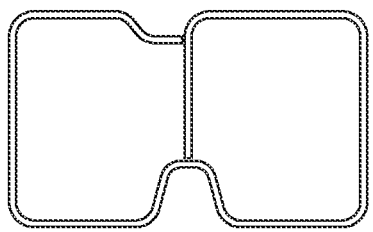
Figure 21B:
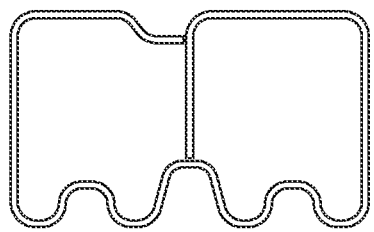
Figure 22A:
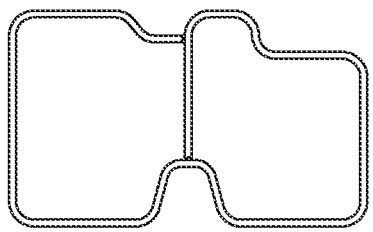
Figure 22B:
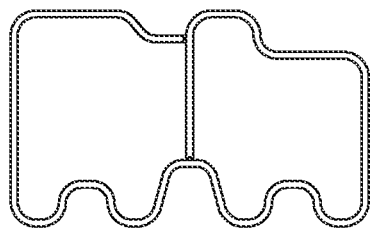
Figure 23A:
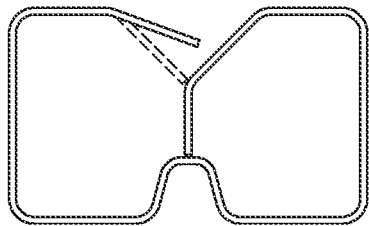
Figure 23B:
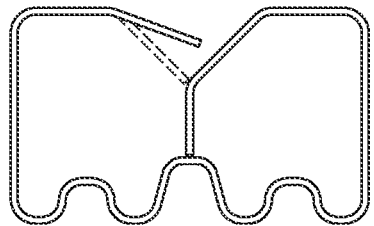

Referring now to FIGS. 9-10A, an additional example of a galvanized multi-tubular reinforcement beam 210 is shown with two adjacent tubular portions 218, 220 that also share a common center wall 232 that divides the tubular portions 218, 220 longitudinally along a length of the beam 210. The beam 210 is similar to the beam 10 shown in FIG. 3A, except that the second weld seam 222b of the reinforcement beam 210 is a substantially T-shaped. Specifically, the weld seam 222b may be referred to as a tee joint or a T-shaped joint, where the edge portion 223 of the sheet 212 that has the edge 224b is inset inward by an S-shaped curve 225 in the rear wall 240 and oriented generally parallel relative the planar extent of the rear wall 240 as it extends toward the center wall 232. In such an orientation the end portion 223 interfaces in a generally perpendicular configuration with the interfacing intermediate portion 226b of the center wall 232. The S-shaped curve 225 and resulting inset edge portion 223 provides a rib 247 at the rear face of the beam 210 to result in an increased stiffness along the rear surface of the beam 210.

The weld seams 222a, 222b on the beam 210 shown in FIGS. 9-10A may be formed with a high frequency welding process by passing the formed sheet against high frequency electrical resistance welding contacts before entering a closing pressure roll that presses the respective edges 224a, 224b and intermediate portions 226a, 226b of the sheet together to close the respective weld seam 222*a*, 222*b*. The forming and welding process of the beam shown in FIGS. 9-10A may be substantially the same as that described above with reference to the beam 10 shown in FIGS. 1-6A.

The tubular portions 218, 220 of the beam 210, such as oriented in FIGS. 9-10A, each also have front walls 234, 236 and rear walls 238, 240 that are generally aligned with each other. The upper tubular portion 218 is provided with an upper wall 242 of the beam 210 and the lower tubular portion 220 is provided with a lower wall 244 of the beam 210. The front walls 234, 236 of the tubular portions 218, 220 are substantially aligned in a common plane with each other so as to form an outward facing or impact surface of the beam 210 when used as a bumper reinforcement beam. Similarly, the rear walls 238, 240 are in general planar alignment with each other and are substantially parallel with the front walls 234, 236. Further, the upper and lower walls 242, 244 are substantially parallel with each other and the center wall 232 and generally perpendicular with the front and rear walls 234, 236, 238, 240. The corners between the walls of the tubular portions 218, 220 of the beam 210 have a curvature generally defined by the material type and thickness of the metal sheet 212.

As further shown in FIGS. 9-10A, the front walls 234, 236 of the tubular portions 218, 220 each include a stiffening rib 246 that protrudes into an interior volume of the respective tubular portion to stiffen the front impact face of the reinforcement beam 210. The illustrated stiffening ribs 246 have a width diameter about 10%-40% of a width of the corresponding wall section (or more preferably about 20%-30% of the width of the corresponding wall section) and has a depth about equal to its width diameter. The bottoms of the illustrated stiffening ribs 246 are semicircular shaped. Nonetheless, it is contemplated that a depth and size of the stiffening ribs can be made shallow, deeper, wider, narrower, flat-bottomed, or otherwise modified to satisfy specific requirements of a beam.

As illustrated in FIGS. 11A-23B, further embodiments of reinforcement beams are shown that have two adjacent tubular portions that also share a common center wall that divides the tubular portions longitudinally along a length of the respective beam. The tubular portions of these additional embodiments each also have front walls and rear walls that are generally aligned in a common plane with each other, such as to form an outward facing or impact surface of the beam when used as a bumper reinforcement beam. Similarly, the rear walls of these additional embodiments are in general planar alignment with each other and are substantially parallel with the front walls. These additional embodiments each have at least one weld seam that is a tee joint or a T-shaped joint, where the edge portion of the sheet interfaces in a generally perpendicular configuration with the interfacing intermediate portion of the sheet. The weld seams of these additional beams may be formed with a high frequency welding process, such as the high frequency contact welding process described above and with reference to the beam shown in FIGS. 1-6.

In another implementation of the forming process for a reinforcement beam as disclosed herein, the weld seam may be formed with a high frequency induction welding process by passing the formed sheet through an induction coil immediately before entering a closing pressure roll that closes the weld seam. The induction coil heats the outside surface of the two opposing portions of the weld seam with high frequency current to a suitable welding temperature, such that the two heated opposing portions are then pressed together by the closing pressure roller to from a solid state forge weld. The skin effect and proximity effect of applying the high frequency current to the partially formed beam causes heating to occur at the outside surfaces of the edge of the sheet and the intermediate portion of the sheet where these portions of the sheet interface and come together. When the outside surfaces of the sheet are heated by the induction coil, the galvanized coating at least partially burns off at the edge and intermediate portion of the sheet and forms zinc oxide gas. These zinc oxide gases generally do not interfere with the quality and consistency of the solid state forge weld formed by the closing pressure roll. The pressure applied by the closing pressure roll may reduce or eliminate the trapping of zinc oxide gases in or near the resulting weld, such as to form a solid state forge weld that is generally void of zinc inclusions or other defects related to the zinc oxide gases generated in the process.

In a further implementation, a method of continuously forming a galvanized reinforcement beam includes the steps of: (a) uncoiling a roll of galvanized metal sheet in a generally horizontal plane; (b) roll forming the metal sheet through a set of a plurality of roll stations to form a tubular shape with an edge section of the metal sheet near contact with an intermediate section of the metal sheet; (c) heating outside surfaces of the edge section of the metal sheet and the intermediate section of the metal sheet to a desirable welding temperature with high frequency current delivered to the metal sheet by a pair of electrical contacts, wherein a galvanized coating on the metal sheet at least partially burns off at the heated outside surfaces; and (d) forming a solid state forge weld at the heated outside surfaces of the edge section and the intermediate section of the metal sheet by pressing the outside surfaces together with a closing pressure roll, wherein the solid state forge weld is formed continuously to close a seam of the tubular shape of the reinforcement beam. Also, a second edge of the metal sheet may be welded at a wall of the tubular portion of the reinforcement beam with a second forge weld to enclose a second tubular portion that extends along a length of the reinforcement beam. For example, the second forge weld may be formed after the first tubular portion is closed with the first forge weld, by roll forming the second edge of the galvanized metal sheet closer to the wall of the tubular portion for forming the second forge weld with a second pair of electrical contacts. The first and second tubular portions may share a common center wall of the reinforcement beam, such that the forge welds are disposed at opposing ends of the common center wall. Furthermore, the metal sheet may be uncoiled, roll formed, and welded in a longitudinal direction at a generally constant speed.

For purposes of this disclosure, the term "coupled" (in all of its forms, couple, coupling, coupled, etc.) generally means the joining of two components directly or indirectly to one another. Such joining may be stationary in nature or movable in nature; may be achieved with the two components and any additional intermediate members being integrally formed as a single unitary body with one another or with the two components; and may be permanent in nature or may be removable or releasable in nature, unless otherwise stated.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Numbers, percentages, ratios, or other values stated herein are intended to include that value, and also other values that are "about," "approximately," or "substantially" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value. Also, the terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed:

1. A reinforcement beam for an automotive component, said reinforcement beam comprising:
   a metal sheet roll formed to have a pair of tubular portions that share a common center wall and extend along a length of the reinforcement beam;
   a solid state forge weld formed in-line with the roll formed metal sheet between an edge of the metal sheet and an intermediate portion of the metal sheet to close a seam at an end of the common center wall that encloses one of the pair of tubular portions;
   wherein the edge of the metal sheet that forms the common center wall has outside surfaces that terminate at an end surface that abuts a planar surface of the intermediate portion of the metal sheet along the seam;
   wherein the seam formed by the solid state forge weld extends continuously along the length of the reinforcement beam; and
   wherein, prior to forming the solid state forge weld, the outside surfaces of the edge of the metal sheet and the intermediate portion of the metal sheet are heated with electrical resistance to a desirable forge welding temperature.

2. The reinforcement beam of claim 1, wherein the solid state forge weld has a narrow heat affect zone between 1 mm and 2 mm in width.

3. The reinforcement beam of claim 1, wherein a second edge of the metal sheet is welded at a second end of the common center wall of the reinforcement beam with a second forge weld to enclose the other of the pair of tubular portions that extends along the length of the reinforcement beam.

4. The reinforcement beam of claim 1, wherein the reinforcement beam includes a front impact face defined by front walls of the pair of tubular portions.

5. The reinforcement beam of claim 4, wherein the front wall of at least one of the pair of tubular portions includes a stiffening rib that protrudes into an interior volume of the respective tubular portion to stiffen the front impact face.

6. The reinforcement beam of claim 1, wherein the solid state forge weld is formed with heat generated by electrical resistance of high frequency current that is delivered by electrical resistance welding contacts and a closing pressure roll that presses heated surfaces of the metal sheet together.

7. The reinforcement beam of claim 1, wherein the metal sheet comprises a high-strength steel, and wherein a desired welding temperature is below the melting temperature of the high-strength steel of the metal sheet.

8. The reinforcement beam of claim 7, wherein the metal sheet comprises a galvanized coating, wherein a thickness of the metal sheet is between 1 mm and 1.5 mm, wherein the galvanized coating is electroplated to have a generally uniform thickness that is less than 0.2 mm, and the desired welding temperature burns off the galvanized coating on the metal sheet at the outside surfaces prior to forming the solid state forge weld.

9. A reinforcement beam for an automotive component, said reinforcement beam comprising:
   a galvanized metal sheet roll formed to have a tubular portion that extends along a length of the reinforcement beam;
   a solid state forge weld formed between an edge of the galvanized metal sheet and a planar surface of an intermediate portion of the galvanized metal sheet to close a seam that extends along the tubular portion of the reinforcement beam;
   wherein the edge of the galvanized metal sheet has an end surface disposed substantially perpendicular to outside surfaces of the edge, such that the solid state forge weld is disposed between the end surface and the planar surface of the intermediate portion of the metal sheet along the seam;
   wherein, prior to forming the solid state forge weld, the outside surfaces of the edge of the galvanized metal sheet and the intermediate portion of the galvanized metal sheet are heated to a desirable welding temperature; and
   wherein the desired welding temperature burns off a galvanized coating on the galvanized metal sheet at the outside surfaces prior to forming the solid state forge weld that is generally void of zinc inclusions.

10. The reinforcement beam of claim 9, wherein the solid state forge weld extends continuously along a length of the reinforcement beam to enclose an interior of the tubular portion of the reinforcement beam.

11. The reinforcement beam of claim 9, wherein the edge and the intermediate portion of the galvanized metal sheet form a tee joint at the solid state forge weld.

12. The reinforcement beam of claim 9, wherein a second edge of the galvanized metal sheet is welded at a wall of the tubular portion of the reinforcement beam with a second forge weld to enclose a second tubular portion that extends along a length of the reinforcement beam.

13. The reinforcement beam of claim 12, wherein the tubular portions share a common center wall of the reinforcement beam.

14. The reinforcement beam of claim 13, wherein the forge welds are disposed at opposing ends of the common center wall.

15. The reinforcement beam of claim 14, wherein the reinforcement beam includes a front impact face defined by front walls of the tubular portions that are disposed in planar alignment with each other.

16. The reinforcement beam of claim 9, wherein the galvanized metal sheet comprises a high-strength steel, and wherein the desired welding temperature is below the melting temperature of the high-strength steel of the galvanized metal sheet.

17. The reinforcement beam of claim 9, wherein a thickness of the galvanized metal sheet is between 1 mm and 1.5 mm, and wherein the galvanized coating is electroplated to have a generally uniform thickness that is less than 5 mils.

\* \* \* \* \*